US008010262B2

(12) United States Patent
Schroeder et al.

(10) Patent No.: US 8,010,262 B2
(45) Date of Patent: Aug. 30, 2011

(54) APPARATUS AND METHOD FOR AUTOMATICALLY CONTROLLING THE SETTINGS OF AN ADJUSTABLE CROP RESIDUE SPREADER OF AN AGRICULTURAL COMBINE

(75) Inventors: Jay David Schroeder, Coal Valley, IL (US); Tyler Lee Nelson, Eldridge, IA (US); Dale William Panoushek, Orion, IL (US)

(73) Assignee: CNH America LLC, New Holland, PA (US)

( * ) Notice: Subject to any disclaimer, the term of this patent is extended or adjusted under 35 U.S.C. 154(b) by 189 days.

(21) Appl. No.: 12/603,034

(22) Filed: Oct. 21, 2009

(65) Prior Publication Data

US 2011/0093169 A1    Apr. 21, 2011

(51) Int. Cl.
*G06F 7/70* (2006.01)
*G06F 19/00* (2011.01)

(52) U.S. Cl. ........................................................ 701/50

(58) Field of Classification Search ............... 56/10.2 R, 56/10.2 A–10.2 F, 503; 460/1, 111, 112, 460/113, 119; 239/650, 673, 667, 668, 661, 239/63, 67, 155; 222/23, 283, 624, 626; 701/50

See application file for complete search history.

(56) References Cited

U.S. PATENT DOCUMENTS

| | | | |
|---|---|---|---|
| 3,677,540 A * | 7/1972 | Weiss ............................ 222/23 |
| 3,792,709 A * | 2/1974 | Johnson et al. .................. 137/47 |
| 4,230,280 A * | 10/1980 | Leigh et al. .................... 239/677 |
| 4,383,536 A * | 5/1983 | Delorme ......................... 460/1 |
| 5,488,817 A | 2/1996 | Paquet et al. |
| 5,569,081 A * | 10/1996 | Baumgarten et al. ......... 460/112 |
| 6,092,745 A * | 7/2000 | Seymour et al. ............... 239/675 |
| 6,292,729 B2 | 9/2001 | Falck et al. |
| 6,331,142 B1 * | 12/2001 | Bischoff ........................ 460/112 |
| 6,397,571 B1 * | 6/2002 | Ehrecke ...................... 56/10.2 R |
| 6,681,551 B1 | 1/2004 | Sheidler et al. |
| 6,698,524 B2 | 3/2004 | Bernhardt et al. |
| 6,729,953 B2 | 5/2004 | Bueermann |
| 6,783,454 B2 | 8/2004 | Bueermann |
| 6,840,853 B2 | 1/2005 | Foth |
| 6,939,221 B1 | 9/2005 | Redekop et al. |
| 6,976,913 B2 | 12/2005 | Duquesne et al. |
| 6,980,895 B2 | 12/2005 | Paice et al. |
| 7,186,179 B1 | 3/2007 | Anderson et al. |
| 7,261,633 B2 | 8/2007 | Benes |
| 7,306,174 B2 | 12/2007 | Pearson et al. |
| 7,390,253 B2 * | 6/2008 | Farley et al. ................... 460/111 |
| 7,467,997 B2 | 12/2008 | Niermann et al. |
| 7,473,169 B2 | 1/2009 | Isaac |
| 7,487,024 B2 | 2/2009 | Farley et al. |
| 7,496,545 B2 | 2/2009 | Chung |
| 7,502,678 B2 | 3/2009 | Diekhans et al. |
| 7,927,200 B2 * | 4/2011 | Van Overschelde et al. . 460/112 |
| 2008/0133095 A1 | 6/2008 | Erdmann et al. |
| 2009/0037059 A1 | 2/2009 | Huster et al. |

* cited by examiner

*Primary Examiner* — Robert Pezzuto
(74) *Attorney, Agent, or Firm* — Michael G. Harms; Patrick M. Sheldrake

(57) ABSTRACT

An apparatus and method for automatically controlling the settings of an adjustable crop residue discharge system of an agricultural combine is provided. The apparatus includes a sensor, an actuator, and a controller. The sensor detects a position of a residue deflector and/or a speed of the residue discharge system. The actuator operatively controls the residue deflector to adjustably position the residue deflector. The controller is operatively connected to the sensor and actuator. The controller includes a memory, a speed input device, a position input device, and a mode input device. The controller is configured to store in memory a plurality of positions and speeds of the residue discharge system and automatically adjust the positions and speeds of the residue discharge system upon receiving an input to change to headland mode.

10 Claims, 9 Drawing Sheets

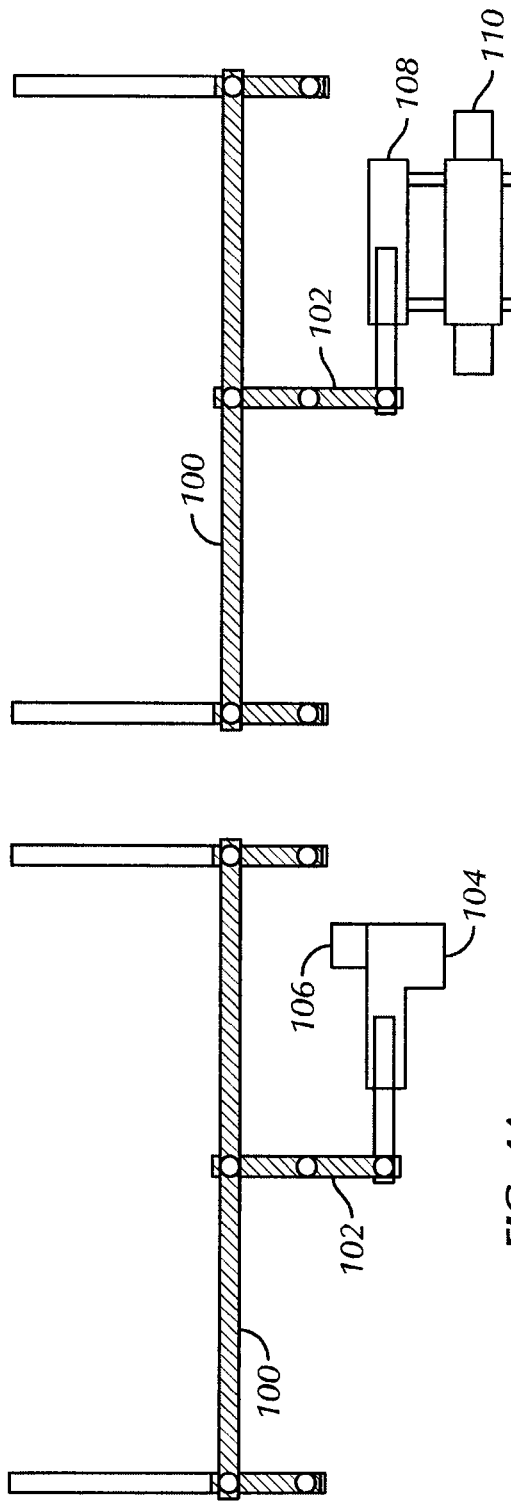
FIG. 4A
FIG. 4B
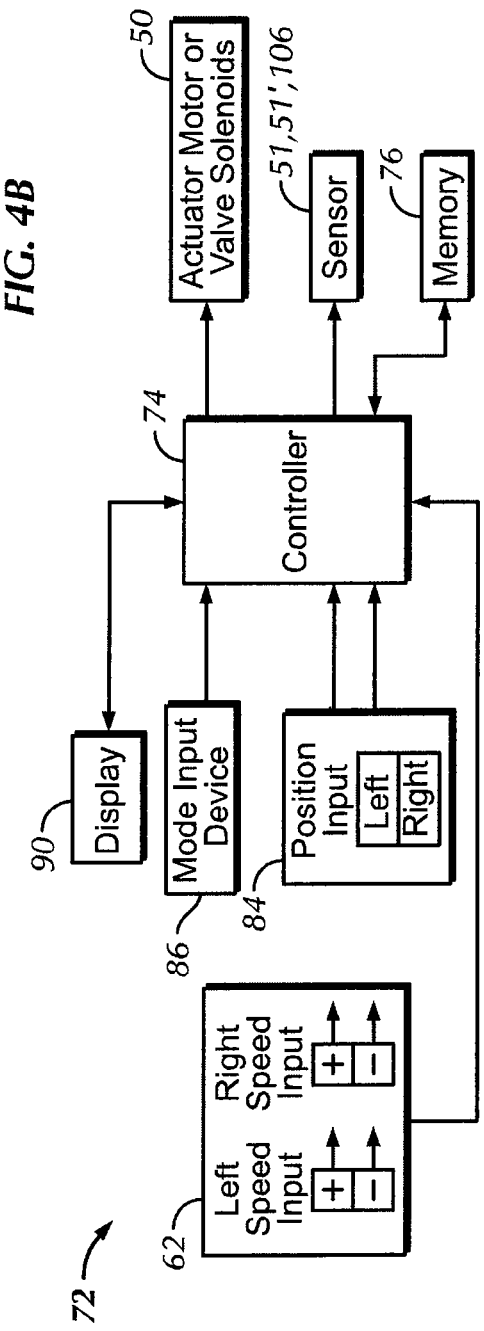
FIG. 5

APPARATUS AND METHOD FOR AUTOMATICALLY CONTROLLING THE SETTINGS OF AN ADJUSTABLE CROP RESIDUE SPREADER OF AN AGRICULTURAL COMBINE

BACKGROUND OF THE INVENTION

The present invention relates generally to agricultural combines, and more particularly, to an apparatus and method for automatically controlling the settings of an adjustable crop residue spreader of an agricultural combine that operates between a harvest mode and a headland mode.

Currently, agricultural harvesting machines such as agricultural combines typically include a spreader for propelling crop residue onto a harvested field, which will typically include stalks, leaves and cobs separated from corn or maize; straw and chaff separated from wheat and other grasses; and stalks, leaves and pods of legumes such as soybeans. In many instances it is desirable for the crop residue to be spread as evenly as possible over the width of the harvested swath, to avoid problems resulting from uneven spreading, such as, but not limited to, difficulty in passage of fall tillage tools through residue clumps or thick areas; uneven insulation of the field resulting in uneven field warming and thawing and weed or crop emergence during the following planting season; and increased rodent and insect habitat. Some spreaders can also have a capability for chopping the crop residue. Accordingly, the term chopper as used herein can refer to devices having a spreading capability, as well as those having both a spreading and a chopping capability.

It is known to provide apparatus, such as, but not limited to, spreader boards, distributors, and deflectors which are adjustable and/or movable and/or changeable and/or positionable, for variably or adjustably controlling and/or guiding airborne flight of the crop residue from the spreader for distribution over a field. It is also known to vary the rotational speed of impellers of a spreader, either alone or in association with other apparatus adjustments, for effecting changes in crop residue flight and distribution, for instance, to provide a distribution pattern having a particular sideward extent or width, typically closely equal to the width of a harvested swath of a field. More recently, it is known to provide a capability to control or adjust these parameters (such as speed and position) remotely, for instance, using an operator switch, such as a position control device 84, in the operator cab of the machine.

Combine headers having a width of 20 to 30 feet are currently well known, and headers having widths of 36 to 40 feet are also known. Such headers of different widths are commonly used interchangeably with a single combine. For instance, the owner or operator of a combine may have a grain header which is used for harvesting smaller grains such as wheat and soybeans, and a corn header for harvesting corn or maize. These headers can be of different widths, and thus will harvest correspondingly different width swaths of a field. The difference between the crops, and other conditions, e.g., moisture content and wind, will also effect different flight and/or distribution characteristics of the crop residue. As a result, the adjustable parameters of a spreader must be set for the header to be used, as well as for the crop to be harvested and the current conditions of the crop and other variables, such as weather.

A problem that has been encountered, however, is that crop spreading conditions can vary over the course of a harvesting operation. For instance, crop population can vary; and crop residue distribution and location can change as a result of winds, particularly cross-winds, changes in the direction of travel, varying contours of a field or obstacles therein that require following curved swaths, and turning, such as in the headlands of a field. Typically, when cross-wind conditions are present, the sideward alignment of a pattern of crop residue deposition will have to be adjusted from time to time, such as when a harvesting machine and or wind changes direction and/or speed. Current residue handling systems require the operator to manually activate a control in the combine cab to redirect the residue in the opposite direction when the combine turns around at the headland.

Thus, what is sought is an apparatus and method for automatically controlling the settings of an adjustable crop residue spreader of an agricultural combine to adjust to changing conditions and otherwise improve crop residue spreading and distribution, and which avoids one or more shortcomings and problems of the prior art devices.

BRIEF SUMMARY OF THE INVENTION

In a preferred embodiment, the present invention provides an apparatus for automatically controlling the settings of an adjustable crop spreader of an agricultural combine that operates between a harvest mode and a headland mode, comprising: a sensor to sense at least one of a position of a residue deflector of a residue discharge system and a speed of the residue discharge system; an actuator operatively connected to the residue deflector to adjustably change the position of the residue deflector; a controller operatively connected to the sensor, the actuator, and the residue discharge system, the controller having: a memory, a speed input device for controlling the speed of the residue discharge system; a position input device for controlling the position of the residue discharge system, and a mode input device for inputting one of a headland mode and a harvest mode, wherein the controller is configured to store in the memory at least one of a first position and a first speed of the residue discharge system when the combine is traveling in a first direction of travel and the controller receives an input to change to headland mode, store in the memory at least one of a second position and a second speed of the residue discharge system when the combine is traveling in a second direction of travel and the controller receives an input to change to headland mode, responsively control the residue discharge system to change the at least one of the position and speed of the residue discharge system to the first position or the first speed when the combine is traveling in the second direction and the controller receives an input to change to headland mode, and responsively control the residue discharge system to change the at least one of the position and speed of the residue discharge system to the second position or the second speed when the combine is traveling in the first direction and the controller receives an input to change to headland mode.

In another preferred embodiment, the present invention provides a method of automatically controlling the settings of an adjustable crop residue discharge system of an agricultural combine that operates between a harvest mode and a headland mode, comprising the steps of: providing a sensor to sense at least one of a position of a residue deflector of a residue discharge system and a speed of the residue discharge system; providing an actuator operatively connected to the residue deflector to adjustably change the position of the residue deflector; providing a controller operatively connected to the sensor, the actuator, and the residue discharge system the controller having: a memory, a speed input device for controlling the speed of the residue discharge system, a position input device for controlling the position of the residue discharge system, a mode input device for inputting at least one of a headland mode and a harvest mode; storing in the memory at least one of a first position of the residue deflector and a first speed of the residue discharge system when the combine is traveling in a first direction of travel and the controller receives an input to change to headland mode; storing in the memory at least one of a second position of the residue deflector and a second speed of the residue discharge system when the combine is traveling in a second direction of travel and the controller receives an input to change to headland mode; operatively controlling the residue discharge system to change the at least one of the position and speed of the residue discharge system to the first position or the first speed when the combine is traveling in the second direction and the controller receives an input to change to headland mode; and operatively controlling the residue discharge system to change the at least one of the position and speed of the residue discharge system to the second position or the second speed when the combine is traveling in the first direction and the controller receives an input to change to headland mode.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 4A and 4B are schematic plan views of exemplary linkage systems for adjustably controlling a spreader device;

FIG. 5 is a simplified block diagram of elements of the apparatus for automatically controlling the settings of an adjustable crop residue spreader in accordance with a preferred embodiment of the present invention;

DETAILED DESCRIPTION OF THE INVENTION

Figure 1:
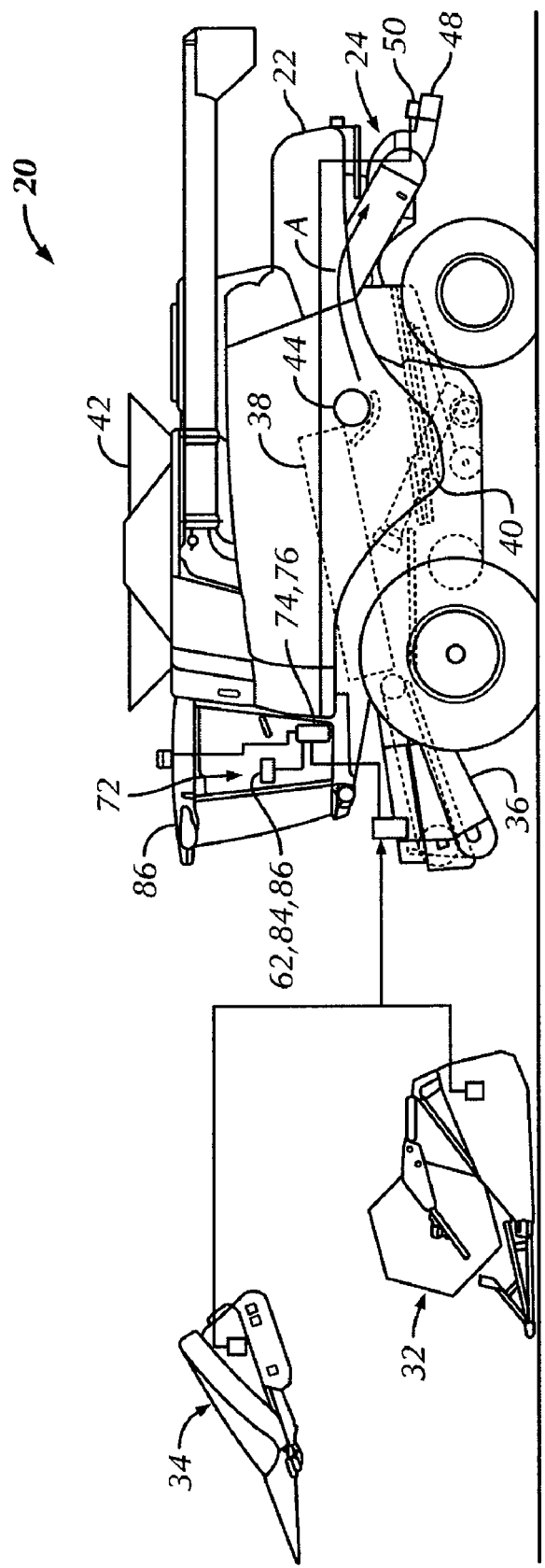
FIG. 1 is a side elevational view of an agricultural combine including one embodiment of an adjustable crop residue spreader in connection with an apparatus for controlling settings thereof according to the present invention.

Certain terminology is used in the following description for convenience only and is not limiting. The words "right," "left," "upper," and "lower" designate directions in the drawings to which reference is made. In particular, "fore" means towards the front and "aft" means towards the rear. In addition, "superior" means generally above while "inferior" means generally below and "laterally" means towards the outer sides. The terminology includes the words above specifically mentioned, derivatives thereof, and words of similar import.

In a first preferred embodiment, the present invention provides an apparatus for automatically controlling the setting of an adjustable crop residue spreader 24 of an agricultural combine 20. As well known in the art, agricultural combines operate in a harvest mode and a headland mode. The harvest mode essentially means that the combine 20 is operating with its header 32 in the down position or harvesting position capable of harvesting crops, whereas headland mode essentially means that the combine 20 is operating with its header 32 in the up position or non-harvesting position, such as when the combine 20 makes a U-turn at the headland of a field.

Figure 2:
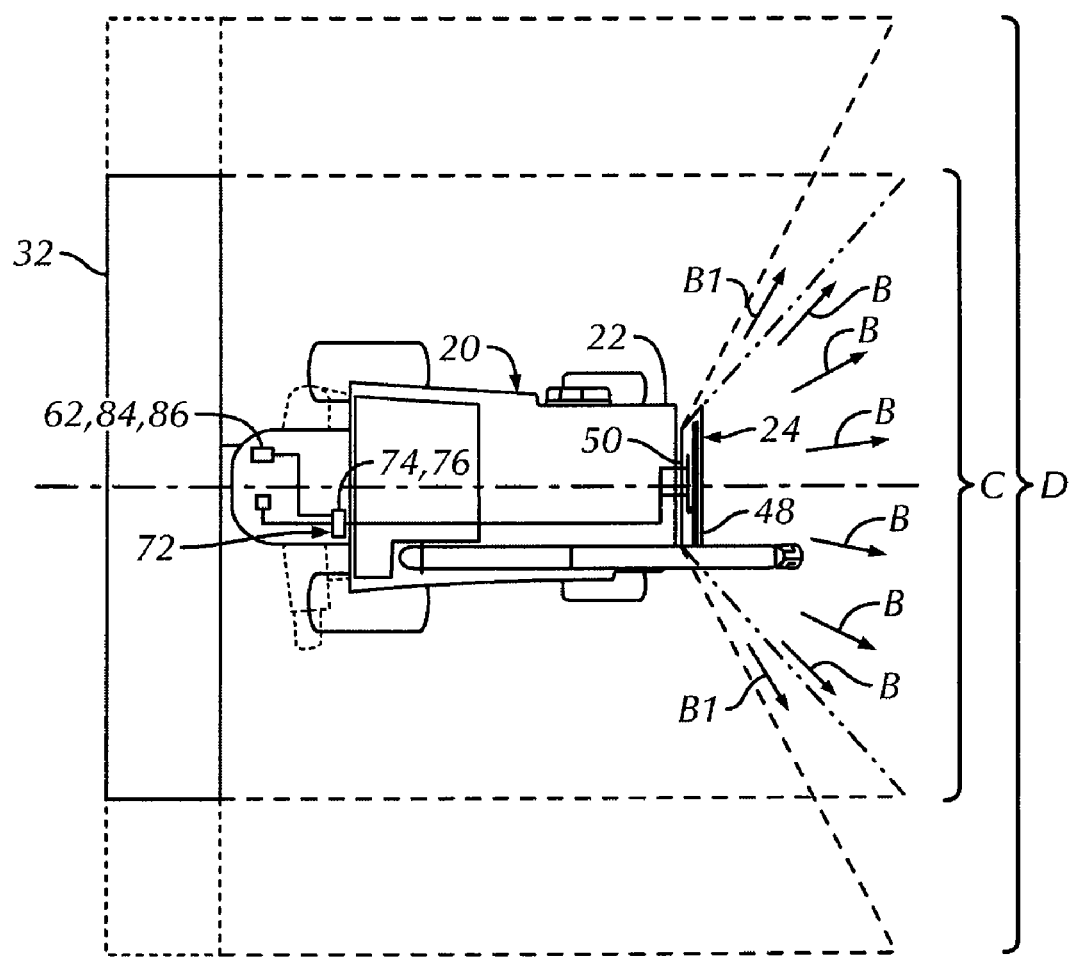
FIG. 2 is a top plan view of the combine of FIG. 1, showing alternative spreader discharge patterns possible using the apparatus and method of the present invention.

Referring now to the drawings, wherein aspects of preferred embodiments of the present invention are shown, in FIGS. 1 and 2, a self-propelled agricultural combine 20 is shown, including a rear end 22 having a crop residue spreader 24 mounted thereon in the conventional manner, and operable for propelling a flow of crop residue therefrom, for deposition in a desired pattern over a field, as automatically set and/or adjusted by a controller 74 and a method of the present invention. Spreader 24 is intended to be representative of a wide variety of spreaders with which controller 74 can be operatively connected to and used, including what are commonly referred to as horizontal spreaders, chopper/spreaders/spread board (spreader 24 of FIGS. 1, 2, 2A, 2B and 3), and vertical spreaders (spreader 28 of FIGS. 3A and 3B), each of which includes one or more drivingly rotatable drivers or impellers, as illustrated by rotating flails 66 in FIGS. 2A and 2B, and by counter-rotating impellers 30 of spreader 28 (denoted schematically by circles and opposing arrows in FIG. 3A, and shown in FIG. 3B) into which a flow of crop residue (downward arrows A in FIG. 3B) is continually fed and which accelerates and discharges the crop residue either rearwardly (FIGS. 2 and 3) or sidewardly (large arrows in FIGS. 3A and 3B) so as to be deposited over a field in a desired pattern, as is well known.

A combine, as represented by combine 20, will include apparatus for harvesting crops from which the crop residue is produced, which harvesting apparatus will typically be a header, such as header 32 shown in FIG. 1, which is commonly referred to as a grain header and is typically utilized for harvesting smaller grains, such as, but not limited to, wheat and soybeans. Headers, such as header 32 used for this purpose can have a variety of widths, for instance, from about 20 to about 40 feet, as is well known. Another well known header 34 is shown, which is a corn header, and will typically be of a 6, 8, 12 or 16 row variety, and will have an overall width from about 20 to about 43 feet. Headers 32 and 34, as well as other headers (not shown), are configured to be interchangeably mounted on the front end of a feeder 36 of combine 20 in the well-known, conventional manner, for configuring combine 20 for harvesting a particular crop.

Briefly, the crops harvested by a header, such as header 32 or header 34, will be gathered up by the header and conveyed by feeder 36 rearwardly and upwardly into the body of the combine 20, for processing by a threshing system 38. System 38 is operable for threshing and separating grain from larger elements of crop material, such as stems, leaves, cobs and larger fragments of pods, such that the grain will fall into a cleaning system 40, which will further process or clean smaller elements of crop residue from the grain, and the grain will be conveyed to a grain tank 42 or other collector. The larger elements of crop material will be propelled rearwardly through a rear end of the body of combine 20 by a rapidly rotating beater 44, and into an inlet opening of the spreader 24, as generally denoted by arrow A, in FIG. 1, and arrows A in FIG. 3B.

Figure 2A:
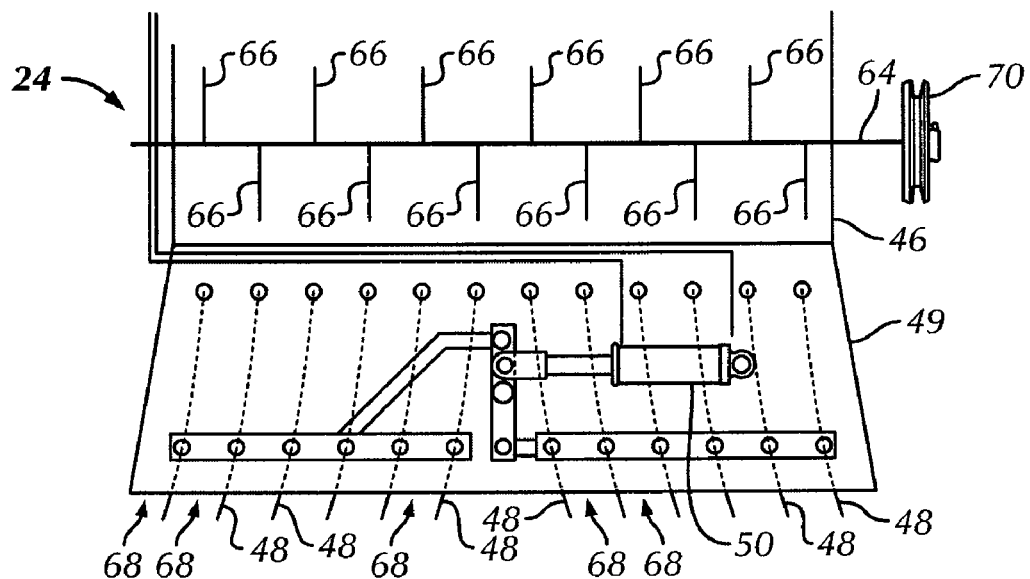
FIG. 2A is a schematic plan view of a spreader of the type shown in FIG. 1, illustrating one representative apparatus remotely controllable for adjusting the positions of adjustable vanes thereof.
Figure 2B:
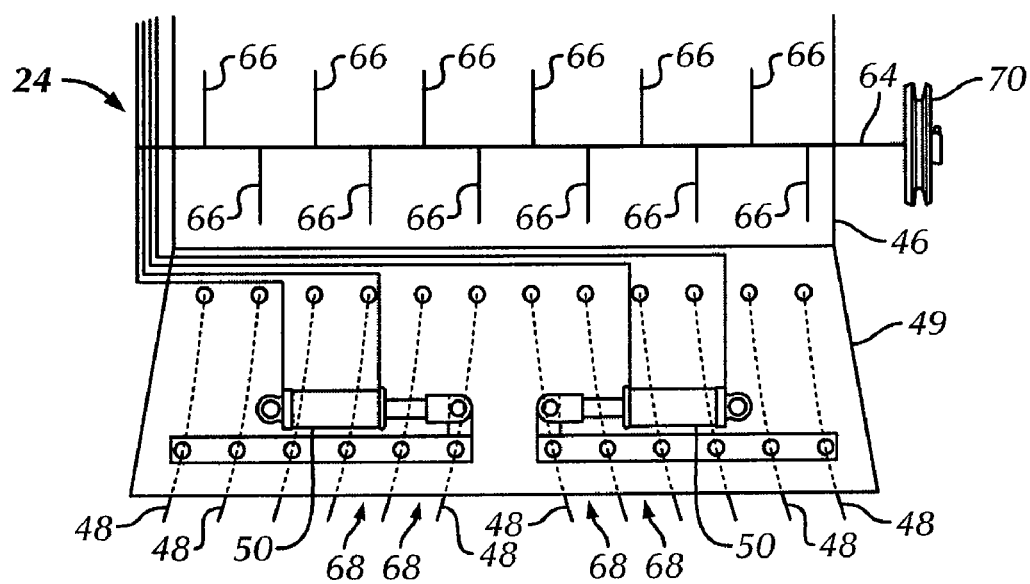
FIG. 2B is a schematic plan view of a spreader of the type shown in FIG. 2A, illustrating an alternative apparatus remotely controllable for adjusting the positions of adjustable vanes thereof.

Addressing spreader 24 in particular, that spreader 24 is operable for propelling the crop residue rearwardly therefrom, as denoted by arrows B and B1 (FIG. 2), as guided or directed by vanes 48 on a spread board 49 (FIG. 2A) extending rearwardly from housing 46 across the width thereof, as is well known. Housing 46 can also optionally contain a plurality of fixed knives or bars (not shown) against which the crop residue is propelled, so as to be chopped, although the knives or bars can be removed, retracted or deleted such the crop residue will be propelled from spreader 24 unchopped, all in the well known manner. As shown in FIGS. 2A and 2B, the positions or orientations of vanes 48 are adjustable or settable by an actuator 50 or actuators 50 for determining a width of a pattern of deposition of the crop material on a field. Actuator 50 can be a linear actuator or actuators, such as, but not limited to, a fluid cylinder, hydraulic cylinder, actuator motor, valve solenoid or an electric linear actuator, a rotary actuator, or any other suitable type actuator of well known construction and operation. For the actuators 50 shown, the width of the pattern of deposition would be increased by the extending or lengthening of the actuator, and decreased by retraction.

Figure 3:
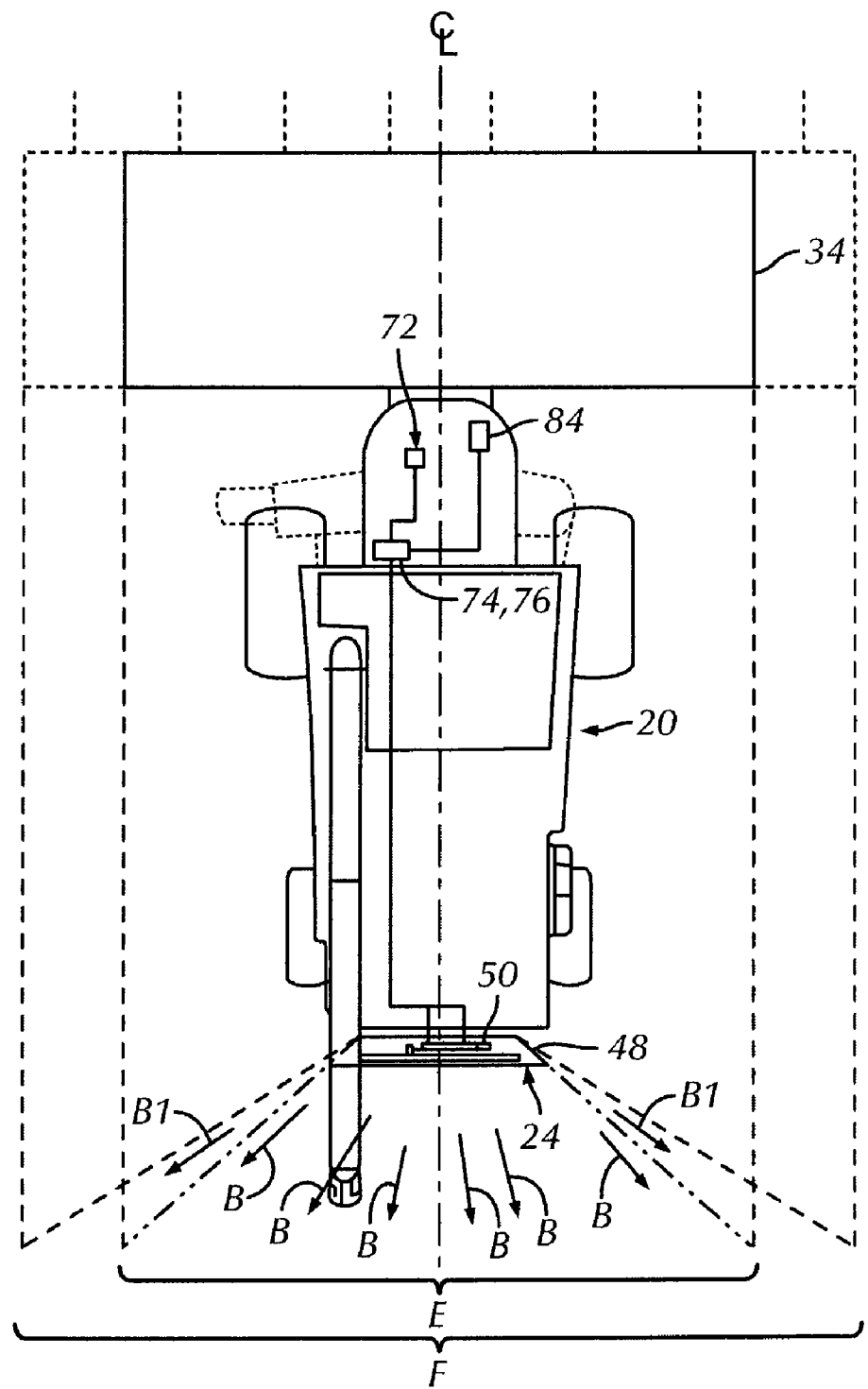
FIG. 3 is schematic plan view of a combine, showing another header connected thereto, and illustrating in dotted lines an alternative width of the header, and alternative spreader discharge patterns possible using the apparatus and method of the present invention.

Two crop residue deposition pattern widths C and D are illustrated in FIG. 2, and two other widths E and F are illustrated in FIG. 3. Widths C and E are achieved by a setting that produces crop discharges B only, and widths D and F are achieved with a wider setting that produces crop discharges B and also B1. In FIG. 2, a smaller width pattern such as width C would be used with a smaller width header, such as header 32, and a wider pattern such as width D would be used with a wider header, such as depicted by header 32. In FIG. 3, a smaller width pattern E would be used with a smaller width header, such as header 34, and a wider pattern F would be used with a wider header 34. In any instance, it is typically desired that the width of the pattern of crop residue deposition or distribution substantially equal the header width. However, as noted above, a problem that can occur is that from time to time, conditions, which can include, but are not limited to, environmental conditions such as wind direction and/or speed, will change or vary, or special geographical features, such as roads or other boundaries will be present, and for which it will be desirable to automatically adjust the spread width, on one or both sides of the combine 20. The present invention has utility for accommodating this, as explained below.

Figure 3A:
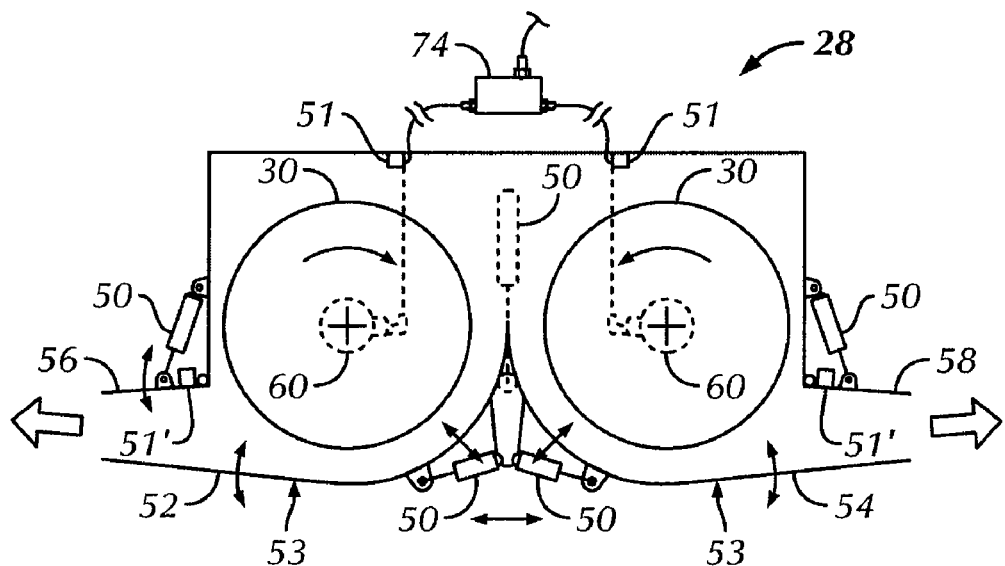
FIG. 3A is a schematic end view of another embodiment of a remotely adjustable crop residue spreader for a combine, and including arrows illustrating possible adjustable parameters of the spreader.
Figure 3B:
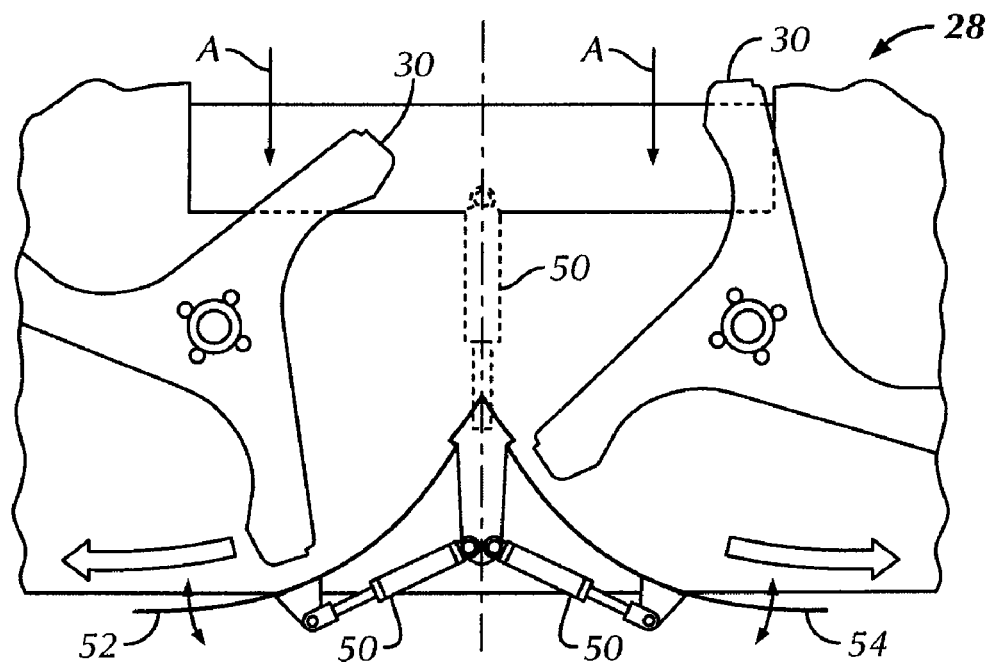
FIG. 3B is a schematic front view of the spreader of FIG. 3A, illustrating a possible actuator configuration operable for effecting settings of the spreader according to the present invention.

Referring to FIGS. 3A and 3B, spreader 28 differs from spreader 24 in that it includes a pair of curved distributors 52 and 54 below counter rotating impellers 30, and a pair of upper guides 56 and 58, each distributor 52 and 54, and guide 56 and 58, preferably being movable in at least one direction through a range of positions, as denoted by any of the associated arrows, for effecting changes in crop residue flow and deposition on a field, for instance, for achieving a crop residue deposition having a width C, D, E or F. Again, suitable actuators can be provided for achieving a desired position, such as actuators 50 illustrated. Impellers 30 of spreader 28 are drivingly rotated by a suitable drive, such as motors 60, which can be, for instance, fluid or electric motors, controlled by a controller 74. Controller 74 can be operatively and/or remotely connected to controllable fluid control valves, or electric motor controllers, or a suitable belt drive, as desired or required for a particular application, controllable for varying a speed of rotation of the impeller or impellers, for changing one or more parameters of crop discharge from the spreader, such as the width of a pattern of deposition of crop residue on a field, as denoted by widths C, D, E and F. Briefly referring again to FIGS. 2A and 2B, housing 46 of spreader 24 supports a rotary shaft 64 supporting a plurality of knives or flails 66 for rotation therewith, for propelling crop residue received from cleaning system 40, rearwardly through channels 68 defined between vanes 48, as is well known. Shaft 64 can be directly driven, for instance, by a fluid or electric motor (not shown), or indirectly, such as by a belt which encircles a sheave 70 on shaft 64, and another sheave on another shaft or a motor (not shown). The speed of rotation of shaft 64 can be controlled by speed input device 62 which can include, for instance, a motor controller, a clutch, and/or a transmission. Here, it should be noted that it is contemplated that the apparatus and method of the invention can be utilized with a variety of spreaders and control devices controllably operable for setting an operating speed of rotary aspects of the spreader 24.

Furthermore, the spreader 28 (i.e., a residue discharge system) is configured with a sensor 51 that senses the speed of the spreader 28. In particular, the sensor 51 senses the speed of the impellers 30 that serves to discharge crop residue out from the spreader 28. The sensor 51 or an additional sensor 51' can be configured to sense the position of the residue deflector 53. The residue deflector 53 can include the guides 56, 58 and curved distributors 52, 54. The residue defectors 53 are capable of movement through a variety of positions to adjust the direction of crop residue discharge to compensate, for example, cross-winds. For example, the residue deflectors 53 are adjustable between 0 degrees and 90 degrees relative to a direction of travel of the combine 20. That is, the residue deflectors 53 can be adjusted to discharge crop residue at an acute, obtuse or right angle relative to the direction of travel of the combine 20, such as 20 degrees, 45 degrees, 60 degrees, 90 degrees, 120 degrees, 140 degrees and 160 degrees relative to the direction of travel of the combine 20.

Addressing environmental conditions, under no or low wind conditions, aligning the sideward position or location of the pattern of crop residue deposition relative to a swath through a field can be a simple matter of making appropriate adjustments discussed above, symmetrically about a forwardly and rearwardly extending centerline CL of combine 20 (FIG. 3). However, when wind conditions are sufficient for affecting the location of crop residue deposition, for instance when blowing sidewardly, and/or frequently changing, some adjustments will likely be necessary to maintain or achieve the desired alignment with the swath. There may also be internal conditions which require this, such as infeeding of a greater amount of crop material to one side of the spreader or the other. Adjustments may also be required when turning and changing direction. Thus, it is contemplated that actuator or actuators 50, and controller 74, as applicable, can optionally be suitably controllable for providing a capability for making asymmetrical adjustments to accommodate such requirements. For instance, the speeds of motors 60 may be adjusted differently, and/or one or more of the distributors, deflectors or vanes on one side of the spreader may be adjusted differently than its counterpart on the other side of the spreader, to provide desired distribution and alignment characteristics.

Further exemplary means of controlling and adjusting the residue discharge system 28, is shown in FIGS. 4A and 4B. Linkages 100, 102 are configured to change the position of the residue deflector e.g., the fin board or flat panel deflector (not shown). Linear actuator 104 is operatively connected to the linkages 100, 102 to adjust and change the position of the residue discharge system. The linear actuator 104 is also configured with a feedback sensor 106. Hydraulic cylinder 108 (FIG. 4B) adjusts the linkages 100, 102 thereby changing the position of the fin board or flat panel deflector based upon feedback from the feedback sensor 106. Valve and solenoids 110 operatively connected to and controlled by the controller 74 are configured to adjust the hydraulic cylinder 108.

Referring to FIG. 5, the controller 74, can be, for instance, a commercially available microprocessor operated controller commonly used for controlling systems of work machines, such as combine 20, and connected via a suitable conductive path to sensors 51, 51' and 106 for retrieving information therefrom. The controller 74 is operatively connected to a position input device 84 and a speed input device 62 to allow a user to manually adjust and change the speed and/or position of the residue discharge system 28. The controller 74 is also operatively connected to a mode input device 86 to allow a user to input at least one of a headland mode or a harvest mode, i.e., change the operational configuration of the combine 20 to either a headland mode or a harvest mode of operation. Memory 76 contains stored information representative of predetermined spreader settings for at least one actuator, such as one or more actuators 50 discussed above, and/or one or more control devices, such as position input device 84 and speed input device 62. Essentially, such stored information will typically include, for instance, a range of positional information such as a length of extension for one or more actuators 50, for positioning vanes 48 of spreader 24 or various of the distributors and/or guides 52, 54, 56 and 58 of spreader 28; and/or a range of motor speeds using speed input device 62, for achieving a particular crop residue deposition pattern width, e.g., one of widths C, D, E or F and other conditions, principal among which will be crop type and environmental conditions, such as cross-winds. The actual position of the actuators, vanes, distributors and guides, and the actual motor or impeller speed, can be determined using a suitable feedback device or devices, such as a position or speed sensor 51, respectively, in the conventional and well-known manner, which position or speed can be inputted to controller 74.

In sum, apparatus 72 for automatically controlling the settings of the adjustable crop residue spreader includes one or more input devices, such as position input device 84, speed input device 62, and mode input device 86, preferably located in an operator cab 86 of the combine 20. The apparatus 72 can optionally include at least one external input device for inputting environmental conditions such as wind direction and speed, connected to controller 74. The operator usable position input device 84 and speed input device 62 can include, for instance, a switch or touch screen, and is usable by an operator for inputting commands to controller 74 for adjusting the spreader setting or settings. This feature also allows changing or adapting the pattern and/or width of the crop residue deposition during operation of the header or prior thereto, for accommodating operator preferences, and changes in environmental conditions such as wind, and other conditions such as crop moisture content, volume and the like.

Figure 6:
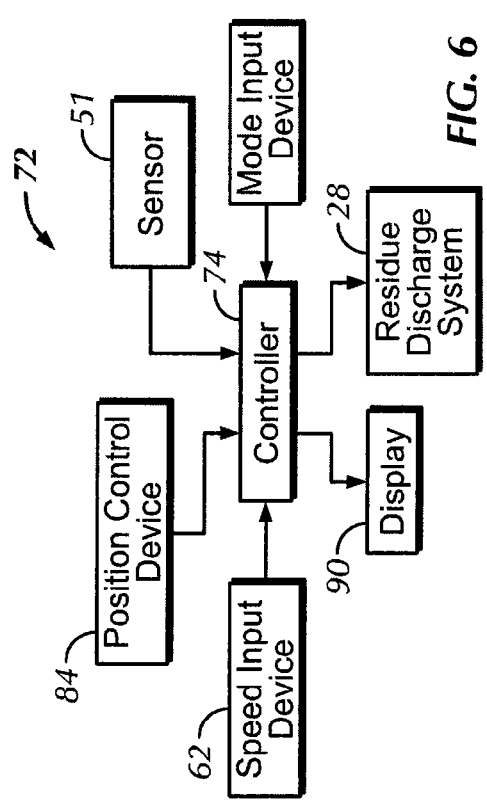
FIG. 6 is a simplified block diagram of elements of the controller of FIG. 5.

The apparatus 72 of the present invention is shown schematically in FIG. 6. The controller 74 monitors various operator commands and sensor feedback to control motors or solenoids. The sensor 51 communicates position or speed of the residue discharge system 28 used to deflect crop residue. The actuator motor or valve solenoids 50 of the residue discharge system 28 operatively controls and changes the position or speed of the residue discharge system 28 used to deflect crop residue. The controller 74 is configured to receive inputs from the mode input device 86 as to when the operator commands for the combine 20 to change to headland mode. The position input device 84 allows an operator to command or adjust the position of the fin board, flat panel deflector, or residue deflectors of the residue discharge system 28. Controls may be switches located in a console or digital controls on the display actuated by a touch screen, keyboard or other known technology. The speed input device 62 allows an operator to command or adjust the speeds of e.g., the spreader discs, fans, paddles or blowers of a residue discharge system. The position input device 84 or speed input device 62 controls may be switches located in a console or digital controls on the display actuated by a touch screen, keyboard or other known technology. A display 90 can be used to show the position and/or speed of the residue discharge system 28 deflecting the crop residue.

An exemplary method of the present invention is as follows. A sensor 51 is provided to sense at least one of a position of the residue deflector 53 and a speed of the residue discharge system 28. An actuator 50 operatively connected to the residue deflector 52 to individually and adjustably change the position of each of the left and right residue deflector 53 is also provided. Additionally, a speed input device 62 operatively connected to the residue discharge system 28 is provided to individually and adjustably change the speed of each motor 60 of the residue discharge system 28 thereby changing the speed at which the residue discharge system 28 discharges residue.

A controller 74 is provided and configured to be operatively connected to each sensor 51, actuator 50, and speed input device 62. As the combine 20 is operated and travels down a first direction of the field, the controller 74 is configured to store in memory 76 at least one of a first position of the residue deflector 53 and a first speed of the residue discharge system 28 when the combine 20 changes to headland mode. The controller 74 is also configured to store in memory 76 at least one of a second position of the residue deflector 53 and a second speed of the residue discharge system 28 when the combine 20 changes to headland mode when the combine 20 is traveling in a second direction of travel. Typically, the second direction of travel will be in the opposite direction or substantially 180 degrees from the direction of travel of the first direction.

Figure 8:
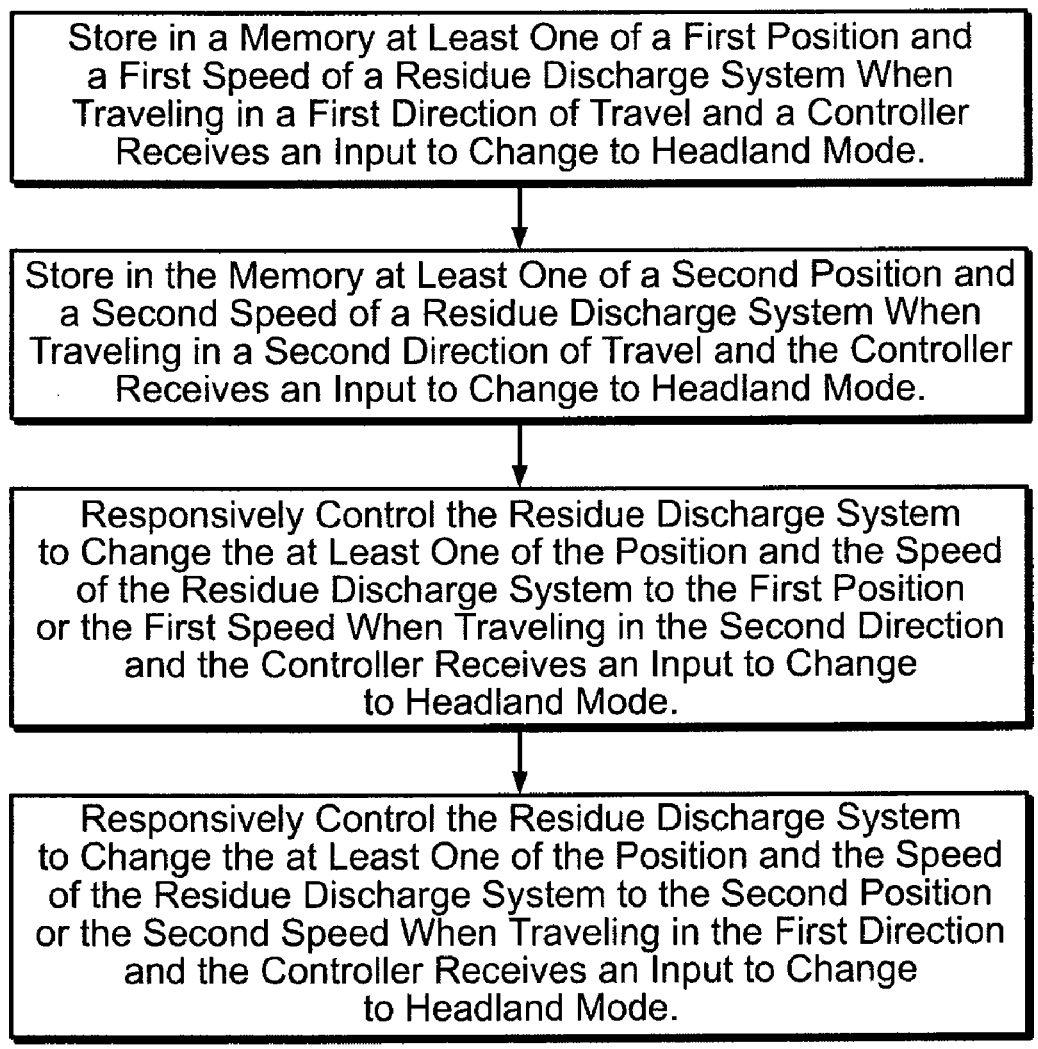
FIG. 8 is a high level flow diagram illustrating the steps of a controller configured to automatically control the settings of an adjustable crop residue spreader of a combine.
Figure 9:
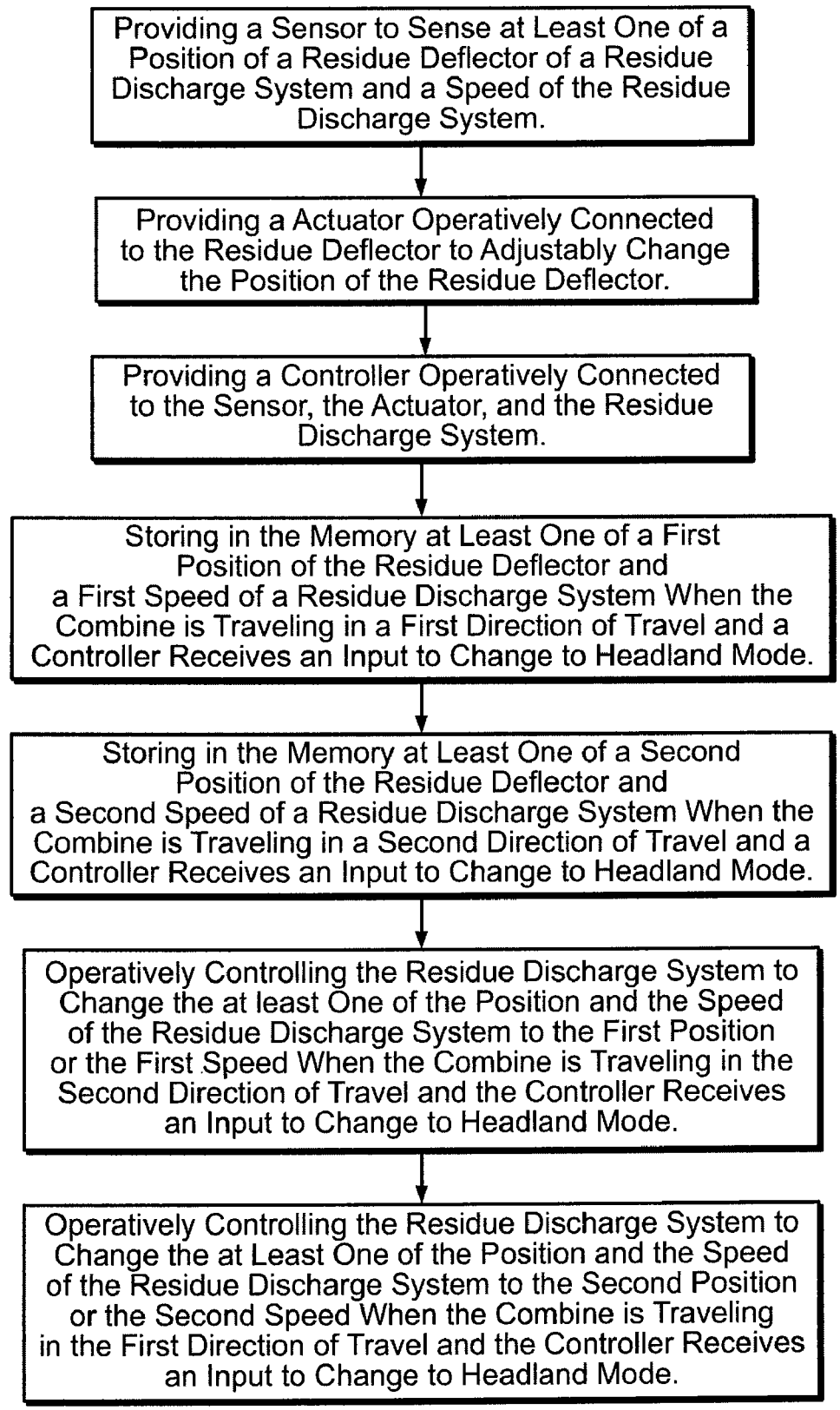
FIG. 9 is another high level flow diagram illustrating steps of a method for automatically controlling the settings of an adjustable crop residue spreader in accordance with another aspect of the present invention.

When the combine 20 is traveling in a first direction and the controller 74 detects a change to or receives an input to change to headland mode, the controller 74 operatively controls the actuator 50 to change the position of the residue deflector 53 to the second position and the speed of the residue discharge system 28 to the second speed, which has previously been stored in memory 76. When the combine 20 is traveling in a second direction and the controller 74 detects a change to or receives an input to change to headland mode, the controller 74 operatively controls the actuator 50 to change the position of the residue deflector 53 to the first position and the speed of the residue discharge system 28 to the first speed, which has previously been stored in memory 76. A flowchart of the operational steps of the controller 84 is shown in FIG. 8. A flowchart of the method of automatically controlling the settings of an adjustable crop residue spreader in accordance with a preferred embodiment of the present invention is shown in FIG. 9.

An operator of the combine 20 can further operatively control the controller 74 to adjust at least one of the first position and first speed when the combine is traveling in the first direction, thereby defining an adjusted first position and an adjusted first speed. The adjusted position and speed may be necessitated by changing cross-wind conditions during harvesting. Afterwards, the controller 74 stores in memory 76 the adjusted first position and the adjusted first speed when the controller 74 detects a change to or receives an input to change to headland mode. In addition, the operator can operatively control the controller 74 to adjust at least one of the second position and the second speed when the combine is traveling in the second direction, thereby defining an adjusted second position and an adjusted second speed. Afterwards, the controller 74 stores in memory 76 the adjusted second position and the adjusted second speed when the controller 74 detects a change to or receives an input to change to headland mode.

In sum, the present invention advantageously provides for a combine 20 that can automatically adjust a spreader 24, 28 for the spreading of crop residue. When a combine 20 travels along a path and experiences cross-winds, the operator adjusts the spreader 24, 28 to provide a crop residue spread substantially equal to the length of the combine header 32, 34. To accomplish this, the spreader's right sided residue deflector may be oriented at a different position, or angle relative to the combine's direction of travel, compared to the combine's left sided residue deflector to compensate for cross-winds. For example, when cross-winds are traveling in a westerly direction and the combine is traveling due north, the combine's left handed residue deflector may be positioned at about a 20, 45 or 60 degree angle relative to the direction of travel of the combine whereas the combine's right sided residue deflector may be at about a 90 degree angle relative to the direction of travel of the combine.

Once the optimal spreader 28 settings are set, the operator can visually confirm that the crop residue spread width generally matches the cut width. However, when the operator turns the combine 20 around to travel in the opposite direction upon reaching the headland, the combine 20 is traveling in a different direction relative to the direction of the cross-winds. Assuming the cross-wind direction does not change, the operator will need to readjust the residue deflector to again compensate for the cross-winds. In the example of westerly cross-winds, the operator will for the most part, have to flip the position and/or speed i.e., settings, of the spreader's right and left sided residue deflector (i.e., transpose the right sided residue deflector settings to the left sided residue deflector settings and vice versa) to match the crop residue spread to that of the cut width when turned around to travel in the south bound direction. Thus, eliminating the need to have to constantly adjust the spreader settings upon changing direction will advantageously provide a more efficient operator and operation of the combine 20.

Figure 7:
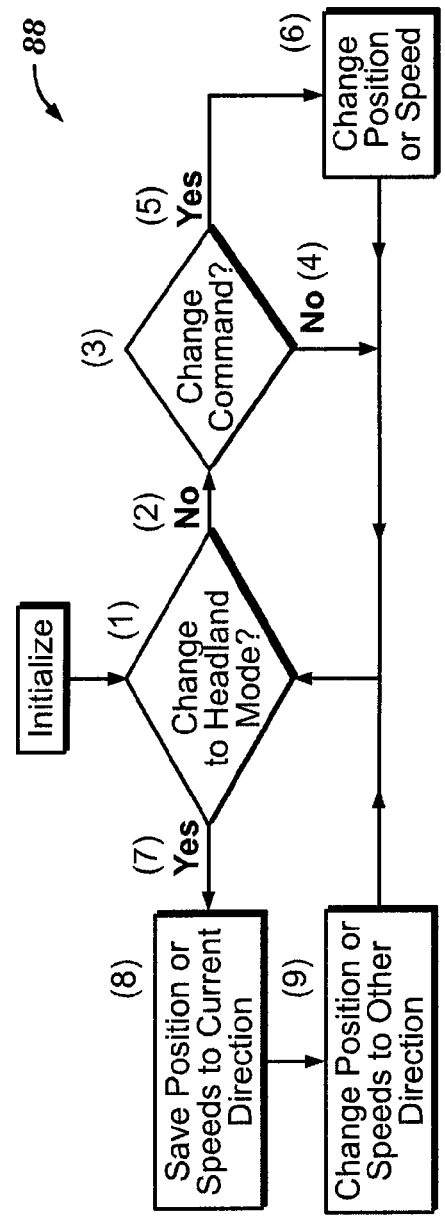
FIG. 7 is high level flow diagram illustrating the operational steps of the controller of FIG. 6.

FIG. 7 illustrates a flow chart 88 exemplifying the operation of the controller 74. The system controller monitors for a change to Headland Mode (1). If "No" (2) change to headland mode is detected, the system monitors for a position (or speed) Command change (3). If "No" (4) Command change is detected, then the system controller 74 returns back to monitoring for a change to Headland Mode (1). If "Yes" (5) a change to headland mode is detected, then the system controller 74 adjusts the position (or speed) (6) of the spreader device that deflects the residue from the combine 20. The system controller 74 then returns back to monitoring for a change to Headland Mode (1). If there is a change to Headland Mode (7), the system controller 74 also saves in memory 76 the position (or speeds) to the current direction of combine travel (8). The system controller 74 then changes the position (or speeds) of the device(s) (9) that deflects the residue. The system controller 74 then returns back to monitoring for a change to Headland Mode (1).

The present invention provides for the operator the ability to adjust each of the stored residue deflector position and residue discharge system speed during travel along a path as needed, as cross-winds often change direction unpredictably. Thus, this versatility allows the operator to adjust the position and speed of the crop residue discharge system 24, 28 while allowing the combine to continuously store any adjusted position and speed for use in the next subsequent run along the same direction of travel.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for automatically controlling the settings of an adjustable crop spreader of an agricultural combine that operates between a harvest mode and a headland mode, comprising:
   a sensor to sense at least one of a position of a residue deflector of a residue discharge system and a speed of the residue discharge system;
   an actuator operatively connected to the residue deflector to adjustably change the position of the residue deflector;
   a controller operatively connected to the sensor, the actuator, and the residue discharge system, the controller having:
      a memory,
      a speed input device for controlling the speed of the residue discharge system;
      a position input device for controlling the position of the residue discharge system, and
      a mode input device for inputting one of a headland mode and a harvest mode,
      wherein the controller is configured to
         store in the memory at least one of a first position and a first speed of the residue discharge system when the combine is traveling in a first direction of travel and the controller receives an input to change to headland mode,
         store in the memory at least one of a second position and a second speed of the residue discharge system when the combine is traveling in a second direction of travel and the controller receives an input to change to headland mode,
         responsively control the residue discharge system to change the at least one of the position and the speed of the residue discharge system to the first position or the first speed when the combine is traveling in the second direction and the controller receives an input to change to headland mode, and responsively control the residue discharge system to change the at least one of the position and the speed of the residue discharge system to the second position or the second speed when the combine is traveling in the first direction and the controller receives an input to change to headland mode.

2. The apparatus of claim 1, wherein the residue discharge system is at least one of a spread board, vertical spreader, horizontal spreader and discharge chute.

3. The apparatus of claim 1, wherein the residue discharge system includes a left and a right residue deflector.

4. The apparatus of claim 1, wherein the sensor is at least one of a speed sensor and a position sensor.

5. The apparatus of claim 1, wherein the actuator is at least one of a linear actuator, a hydraulic cylinder, an actuator motor and a valve solenoid.

6. The apparatus of claim 1, wherein the position of the residue deflector is adjustable between 0 degree and 160 degrees relative to the direction of travel of the combine.

7. The apparatus of claim 1, wherein the speed of the residue discharge system is adjustable to spread crop residue a width of at least two feet.

8. A method of automatically controlling the settings of an adjustable crop residue discharge system of an agricultural combine that operates between a harvest mode and a headland mode, comprising the steps of:

provinding a sensor to sense at least one of a position of a residue deflector of a residue discharge system and a speed of the residue discharge system;

providing an actuator operatively connected to the residue deflector to adjustably change the position of the residue deflector;

providing a controller operatively connected to the sensor, the actuator, and the residue discharge system, the controller having:

a memory, a speed input device for controlling the speed of the residue discharge system, a position input device for controlling the position of the residue discharge system, a mode input device for inputting at least one of a headland mode and a harvest mode;

storing in the memory at least one of a first position of the residue deflector and a first speed of the residue discharge system when the combine is traveling in a first direction of travel and the controller receives an input to change to headland mode;

storing in the memory at least one of a second position of the residue deflector and a second speed of the residue discharge system when the combine is traveling in a second direction of travel and the controller receives an input to change to headland mode;

operatively controlling the residue discharge system to change the at least one of the position and the speed of the residue discharge system to the first position or the first speed when the combine is traveling in the second direction and the controller receives an input to change to headland mode; and operatively controlling the residue discharge system to change the at least one of the position and the speed of the residue discharge system to the second position or the second speed when the combine is traveling in the first direction and the controller receives an input to change to headland mode.

9. The method of claim 8, further comprising the step of operatively controlling the position input device to adjust at least one of the first position and the first speed when the combine is traveling in the first direction and storing in the memory the adjusted at least one first position and first speed as the first position and the first speed when the controller receives an input to change to headland mode.

10. The method of claim 8, further comprising the step of operatively controlling the position input device to adjust at least one of the second position and the second speed when the combine is traveling in the second direction and storing in the memory the adjusted at least one second position and second speed as the second position and the second speed when the controller receives an input to change to headland mode.

* * * * *